United States Patent [19]

Doyle, Jr. et al.

[11] 3,716,967
[45] Feb. 20, 1973

[54] FILTERING APPARATUS

[75] Inventors: Lawrence O. Doyle, Jr., Wayzata; Harlen D. Meek, Anoka, both of Minn.

[73] Assignee: Anti-Pollution Devices, Inc., Hopkins, Minn.

[22] Filed: Sept. 11, 1970

[21] Appl. No.: 71,561

[52] U.S. Cl. ..................55/217, 55/337, 55/267, 55/429, 55/459, 55/467, 55/481, 110/8 R, 110/18 R, 110/119
[51] Int. Cl. ............................................B01d 50/00
[58] Field of Search........55/217, 323, 337, 267, 459, 55/467, 429, 472, 481; 15/327, 319, 339; 110/119, 8 R, 18 R

[56] References Cited

UNITED STATES PATENTS

| 2,143,569 | 1/1939 | Nessell | 55/217 |
|---|---|---|---|
| 2,171,248 | 8/1939 | Van Berkel | 55/233 |
| 3,240,000 | 3/1966 | Hayes et al. | 55/337 |
| 3,395,512 | 8/1968 | Finney, Jr. et al. | 55/97 |
| 3,425,192 | 2/1969 | Davis | 55/459 |
| 3,510,904 | 5/1970 | Lagerstrom | 55/217 |

Primary Examiner—Bernard Nozick
Attorney—Schroeder, Siegfried & Ryan

[57] ABSTRACT

A filtering apparatus adapted to be connected to a burner apparatus of the furnace type in buildings to remove fly ash, smoke and other contaminate particles from the flue gases or discharge gases therefrom. It includes three stages of filtration the first being a cyclone type separator and the second and third stages being mechanical filters. An exhaust or blower assembly is mounted on the casing to draw gases through the filtering apparatus from the chimney. Operation of the same is made automatic by a temperature sensor in the filtering apparatus which is connected to the chimney by means of transverse duct work. An air inlet is provided in the transverse duct work to draw in ambient air along with the gases for the purposes of cooling the same as they pass through the filtering apparatus.

6 Claims, 4 Drawing Figures

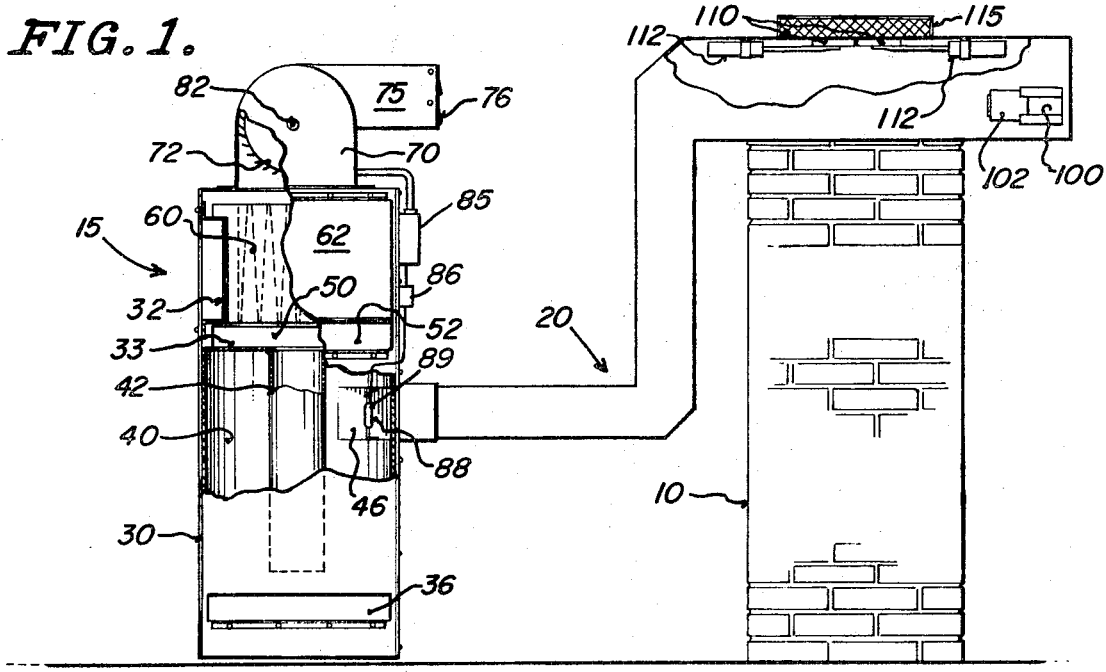
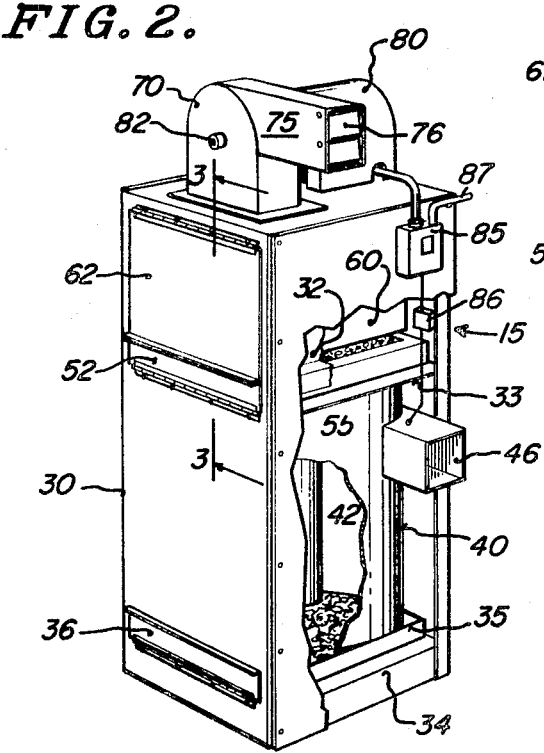
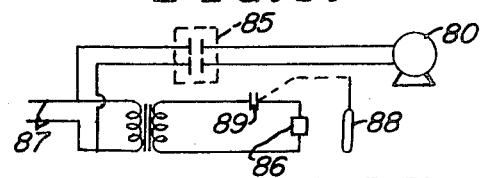

FILTERING APPARATUS

Our invention relates to a filtering apparatus and more particularly to an improved filtering apparatus to be used as an anti-pollution device in connection with filtering exhaust gases from chimneys of furnace type burners.

Filtration devices and filters are well known and in use and take a variety of forms depending upon the application of the same. Similarly stack or chimney filtration is known and complicated filtration apparatus including scrubbers are employed to eliminate fly ash and smoke discharge from the same. Incineration of the high temperature type has been employed to eliminate the problems of pollution caused by smoke discharge and ash discharge from chimneys. Present day anti-pollution laws are such that in most communities, small commercial establishments, hotels and apartment buildings which utilize burners to eliminate rubbish are faced with the problem of burner shutdown because of improper cleaning apparatus associated with the burners to eliminate the smoke and ash discharge into the atmosphere. This is particularly true in connection with burner type apparatus employed in apartment buildings and hotels and other large occupancy type structures. Many such businesses and motels are faced with the problem of handling of rubbish apart from burning since their burning apparatus does not meet anti-pollution laws. Expensive filtration and high temperature incineration is not practical for such installation.

The present invention is directed to a simplified filtering apparatus or filtration apparatus which may be positioned at any location in connection with such businesses or buildings and tied to the exhaust pipes or chimneys of the burners such as to receive the exhaust gases of the same and to remove fly ash, smoke and other pollutants from being discharged to the atmosphere. This will permit such businesses to comply with anti-pollution laws and does not require expensive remodeling or installation of different types burning equipment.

The improved filtration apparatus includes a casing or housing having a plurality of sections therein defined by baffles positioned within the housing. In the lower most of the section is positioned a cyclone type separator with a clean-out at the base of the same and above the cyclone type separator is positioned two stages of filtration which are connected in series with the output of the cyclone to remove all contaminates from the air before discharging the exhaust gases to atmosphere. Each filtration stage is removable for cleaning and the first stage adjacent the cyclone is a wire mesh filter which takes out large particles not removed by the cyclone. The second or last stage of filtration filters out smoke and other particles down to 1 micron in size and lower permitting the filtration apparatus to discharge pollution free air. Air is drawn through the cyclone and filtering apparatus by an exhaust fan positioned on top of the housing which is connected to the casing to draw air therefrom and to exhaust it to atmosphere. The filtration apparatus includes a transition or connecting apparatus adapted to be connected to a chimney and directing exhaust gases therefrom to the input of the cyclone in a conventional manner. An adjustable louver or opening is positioned therein to permit the introduction of ambient air for the purpose of cooling the exhaust gases before filtration to protect the filtering apparatus. The improved filtering apparatus is made automatic by a temperature sensor positioned within the casing and operating a switch in circuit with the electric motor driving the exhaust blower to start the same when ambient temperature within the casing rises to a predetermined point indicating burning at a burning apparatus and increased temperature of exhaust gas in the chimney. When the burner is shut down, absence of the exhaust gas or temperature will permit shutdown of the blower. The casing includes panel sections which open to remove the filtration apparatus for servicing, that is cleaning and repair where necessary.

It is therefore the principal object of this invention to provide an improved filtration apparatus particularly adapted for use in connection with exhaust gases from burners in commercial installations and apartment buildings.

Another object of this invention is to provide a filtration apparatus of this type which incorporates three stages of filtering to remove all contaminates from the exhaust gases of the burner.

A further object of this invention is to provide a filtration apparatus of this type which is automatically operated by burning in a burning apparatus and a rise in temperature in the apparatus with the presence of exhaust fumes therefrom.

A still further object of this invention is to provide in a filtration apparatus of this type a provision for controlling the temperature of the exhaust gases by introduction of ambient air thereto.

Another object of this invention is to provide a filtration apparatus which is low in cost and easy to service and maintain.

These and other objects of this invention will become apparent from a reading of the attached description together with the drawings wherein:

FIG. 1 is a schematic view of the filter apparatus shown in connection with a chimney and the transition duct work connected therebetween, FIG. 2 is a perspective view of the improved filtering apparatus, FIG. 3 is a sectional view of the filtering apparatus of FIG. 2 taken along the lines 3—3 therein, and FIG. 4 is a schematic electrical circuit for the filtering apparatus.

Our improved filtering apparatus is shown schematically in FIG. 1 as connected to a chimney indicated at 10 at a building site or location which is discharging gas, smoke and fly ash from a burner type apparatus located within a building. The improved filtering apparatus is indicated generally at 15 and is connected to the chimney by means of transition, piping or conduit indicated generally at 20. The filtering device 15 is comprised of a casing or housing 30 which is generally rectangular in cross section and includes a plurality of internal baffle members 32, 33 and 34 dividing the casing internally into a plurality of compartments. As will be hereinafter indicated, the baffles have varying types of apertures therethrough providing communication between the compartments within the casing. At the base of a case and defined by the baffle 34 and the bottom thereof is a clean-out section in which is positioned a clean-out drawer 35 with a front panel 36 providing access thereto. Positioned between the baffle 33 and 34 is a cyclone type separator formed of an outer cylindrical member 40 and a smaller and concentric inner cylindrical member 42, the outer cylindrical member 40 being sealed at its upper extremity by the baffle 33 and being opened at its lower extremity communicating with an opening in the baffle 34 allowing particles to drop into the clean-out drawer 35. The outer cylindrical member has a tangential intake duct 46 attached thereto and the inner cylindrical member is open at both extremities being connected to the baffle 33 to provide the outlet or discharge from the cyclone separator into the compartment formed between the baffles 32, 33. Positioned in this compartment is a wire mesh filter indicated generally at 50 which is adapted to remove large particles not separated by the cyclone separator. This compartment is accessible by means of a pivoted panel or door 52 in the front of the case providing access thereto to permit removal of the filter for cleaning purposes.

Positioned between the baffle 32 and the top of the case which is closed is a compartment in which is positioned a large Flanders type filter, indicated generally at 60, the same being mounted on the baffle 32 which has a large aperture therein permitting communication between the filter 50 and the filter 60. This compartment also has a pivoted door 62 in the front of the same permitting access to the filter 60 for maintenance and cleaning purposes. On top of the casing or housing and communicating therewith by means of an aperture (not shown) in the top of the casing is a blower housing 70 having a blower drum type fan 72 positioned therein to draw air through the casing. The blower housing 70 has a tangential discharge duct 75 connected thereto with pressure type louvers 76 positioned in the end of the same. An electric motor 80 is mounted on the top of the cabinet and its output shaft 82 is connected to the drum 72 of the blower to rotate the same. The electric motor has a suitable starter control 85 including a control relay 86 (see FIG. 4) by means of which it may be operated from a remote switch 89 positioned in the inlet duct 46 to the cyclone. The switch 89 is operated from a temperature sensing element 88 positioned therein with the switch being connected in series circuit to the starter coil or relay 86 to connect the same to a source of electric power as evidenced by cable 87 for operating the electric motor and hence the exhaust fan upon predetermined temperature conditions at the inlet to the centrifugal or cyclone separator.

To improve the operation of the filtering device, the transition piping or conduit 20 connecting the filtering device to the chimney includes an adjustable aperture 100 which may be adjusted in size by means of an adjustable plate 102 to vary the size of the opening therein. This opening provides for the introduction of ambient air into the transition duct work to cool the flue gas as they enter the filtering apparatus. The size of the opening will normally be adjusted for normal burning temperatures of the flue gases and for normal cooling of the same to protect the filtering apparatus. If desired, the opening can include pressure responsive counterbalanced louvers which open with operation of the exhaust blower. Such an opening will normally be located adjacent the end of the chimney for efficient cooling.

A fail safe structure is also included in the transition duct work 20 above the end of the chimney which will become operative upon overheating of the duct work, or upon malfunction of the filtering apparatus, such as by electric power failure. This structure includes a pair of adjustable dampers 110 operated by volatile fill actuators 112. The dampers are normally closed with operation of the filtering apparatus during burning and shutdown. However, in the event of malfunction of the filtering apparatus, as by power failure, during burning an increase in temperature of flue gas at the end of the chimney and in the duct work above a predetermined level will cause the dampers to open and the flue gases to be vented to atmosphere unfiltered as a safety measure. However, a protective screen 115 is located above the damper opening in the duct work to prevent the escape of large pieces of fly ash.

In the operation of our improved filtering device the exhaust gases from the chimney with fly ash and other solids and smoke are drawn into the filtering apparatus through operation of the blower. The inlet to the cyclone will direct the exhaust gases in a spiraling path through the cyclone and along the inner surface of the outer cylindrical member 40 toward the open bottom extremity of the inner cylindrical member 42 which is spaced from the baffle 34 and the end of the outer cylindrical member 40 by a predetermined distance. The spiraling gases will have larger ash particles and solids filtered out through the operation of centrifugal force and the gases will be drawn into the inner cylindrical member 42 and directed through the filters 50 and 60 in series with one another and through the blower housing 70 to be discharged through the louver discharge extremity of the same. As the burner apparatus associated with the chimney is placed in operation, a rise in temperature of the exhaust gases emanating therefrom will be directed into the transition member and through the same into the area of the temperature sensing element 88 or switch which will turn the blower on and cause a vacuum to be placed on the transition member and the chimney drawing the exhaust gases through the filtering apparatus. The transition, conduit or piping includes the adjustable aperture 100, therein by means of which outside or ambient air may be also drawn into the duct work and through the filtering apparatus when the blower is in operation. This lower temperature air will tend to cool the exhaust gases permitting the filtering apparatus to operate at a lower temperature and prevent destruction of the filtering materials. This aperture 100 is adjustable by means of plate 102 and is manually set for the normal temperature operating conditions of the filtering device and the gaseous discharge from the chimney with which it is associated. Where desired, the same may be connected through a temperature sensing control to allow the aperture to be opened greater amounts with increased temperature conditions in the burning apparatus. With the operation of the filtering device, blower energization or rotation will continue until burning is ceased in the burning apparatus and the temperature of the air moving through the transition section and into the filtering apparatus is lowered in temperature to a predetermined point which will allow the switching device to open and de-energize the blower motor. Thus the operation of the filtering device is automatic with burning operation. Periodic maintenance or clean-out of the filters 50 and 60 will be conducted to insure an efficient and maximum of filtration therefrom. The filter 50 of a conventional wire mesh type and the filter 60 is of the type shown in the U.S. Pat. No. 2,952,333 to L. Bush dated Sept. 13, 1960 and entitled "Filters." Periodic cleaning of the filters will be required, as well as the clean-out of the particles deposited in the cyclone tray to condition the filtering apparatus for continuous operation.

A safety device in the form of heat motor actuated dampers are included in the duct work above the chimney to open the same in the event of malfunction of the filtering apparatus.

The improved filtering apparatus permits a connection with conventional burning apparatus presently existing in many commercial establishments and in apartment buildings which are not now in operation because of smoke discharge therefrom. This simplified filtering apparatus will insure removal of all fly ash particles and smoke with the discharge of clean heated air from the burner or stack at the outlet of the blower. The operation of the same is automatic with a rise in temperature of the air in the transition duct between the chimney and the filtering apparatus to turn the blower on and filter out of the flue gases all contaminates.

In considering this invention it should be remembered that the present disclosure is illustrative only and the scope of the invention should be determined by the appended claims.

What is claimed is:

1. A filtering device adapted to be connected to a chimney of a furnace type apparatus comprising, a casing, a cyclone type separator positioned in a base portion of the casing, said cyclone type separator being formed by a first cylindrical member positioned in the lower portion of the casing with a second smaller diameter cylindrical member positioned in said lower portion of the casing and concentric therewith with the smaller cylindrical member extending short of the length of the larger cylindrical member and with an air inlet pipe connected tangentially to the larger cylindrical member to direct airflow into the casing to the separator and with an outlet therefrom being connected to the inner cylindrical member, a pair of filter members positioned in said casing above the cyclone type separator with each filter member being separately removable from the casing for cleaning purposes with the filters being positioned at the outlet of the cyclone separator, an exhaust fan including a blower member connected to the casing and having an air inlet connected to an outlet of said casing beyond said filter members and said cyclone with an electric motor drivingly connected thereto for operating the same, said exhaust fan having an outlet remote from said casing, a temperature sensing switch and an electric circuit adapted to be connected to a source of electric power and through the switch to the electric motor of said blower member, said temperature sensing switch being responsive to the rise and fall of temperature within the casing above a predetermined temperature and operative to turn on and off respectively said electric motor to operate said exhaust fan above the predetermined temperature transition means connected to the casing at the inlet to the cyclone and adapted to be connected to a chimney, said transition means including a duct work having an air inlet passage therein with an adjustable louver to vary the size of the inlet air passage and the amount of atmospheric air outside of the duct work being drawn into the casing to cool the exhaust gases from said chimney, and including heat motor actuated dampers positioned in the transition means adjacent the chimney and operative to open the transition means with a rise in temperature of exhaust gases from the chimney above a predetermined temperature.

2. The filtering device of claim 1 in which the casing includes a plurality of baffle sections intermediate the extent of the same defining sections of the casing with apertures through the baffles to define flow passages therein between and with the cyclone separator and the plurality of stages of filtration positioned respectively in the sections defined by the baffle.

3. The filtering device of claim 1 in which the casing includes a plurality of access doors which may be opened to expose the filtration positioned in certain of said sections in the casing.

4. The filtering device of claim 1 in which the lower most section defined by one of the baffles in the casing is positioned beneath the cyclone type separator and includes a clean-out tray receiving dust particles from the cyclone.

5. A filtering device adapted to be connected to a chimney of a furnace type apparatus comprising, a casing, a cyclone type separator positioned in a base portion of the casing, said cyclone type separator being formed by a first cylindrical member positioned in the lower portion of the casing with a second smaller diameter cylindrical member positioned in said lower portion of the casing and concentric therewith with the smaller cylindrical member extending short of the length of the larger cylindrical member and with an air inlet pipe connected tangentially to the larger cylindrical member to direct airflow into the casing to the separator and with the outlet therefrom being connected to the inner cylindrical member, a pair of filter members positioned in said casing above the cyclone type separator with each filter member being separately removable from the casing for cleaning purposes with the filters being positioned at the outlet of the cyclone separator, an exhaust fan including a blower member connected to the casing and having an air inlet connected to an outlet of said casing beyond said filter members and said cyclone with an electric motor drivingly connected thereto for operating the same, said exhaust fan having an outlet remote from said casing, a temperature sensing switch and an electric circuit adapted to be connected to a source of electric power and through the switch to the electric motor of said blower member, said temperature sensing switch being responsive to the rise and fall of temperature within the casing above a predetermined temperature and operative to turn on and off respectively said electric motor to operate said exhaust fan above the predetermined temperature transition means connected to the casing at the inlet to the cyclone and adapted to be connected to a chimney, said transition means including a duct work having an air inlet passage therein with an adjustable louver to vary the size of the inlet air passage and the amount of atmospheric air outside of the duct work being drawn into the casing to cool the exhaust gases from said chimney.

6. The filtering device of claim 5 and including an additional passage means communicating with the chimney and including a heat motor operated damper positioned adjacent said transition means and responsive to rise a temperature of the exhaust gases from the chimney above a predetermined temperature to open said damper and bypass said transition means.

* * * * *